(12) United States Patent
Shishido et al.

(10) Patent No.: US 9,290,012 B2
(45) Date of Patent: Mar. 22, 2016

(54) PRINT CONTROL APPARATUS AND METHOD FOR DUPLEX PRINTING ON A CONTINUOUS SHEET

(75) Inventors: Kazunari Shishido, Yokohama (JP); Sho Nakamura, Yokohama (JP); Takayoshi Noguchi, Tokyo (JP); Atsushi Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 12/957,223

(22) Filed: Nov. 30, 2010

(65) Prior Publication Data

US 2011/0211893 A1 Sep. 1, 2011

(30) Foreign Application Priority Data

Feb. 26, 2010 (JP) .................................. 2010-041656

(51) Int. Cl.
| | |
|---|---|
| *B41J 11/44* | (2006.01) |
| *B41J 3/60* | (2006.01) |
| *G06F 3/12* | (2006.01) |
| *G03G 15/23* | (2006.01) |
| *G03G 15/00* | (2006.01) |

(52) U.S. Cl.
CPC ................. *B41J 3/60* (2013.01); *G06F 3/1215* (2013.01); *G06F 3/1252* (2013.01); *G06F 3/1285* (2013.01); *G03G 15/234* (2013.01); *G03G 15/237* (2013.01); *G03G 15/6517* (2013.01)

(58) Field of Classification Search
CPC .............. G03G 15/234; G03G 15/237; G03G 15/6517; G06F 3/1251; G06F 3/1263; G06F 3/1212; G06F 3/1262; G06F 3/125

USPC .................... 400/76; 399/374, 375, 384, 385; 358/468, 1.1, 1.2; 271/9.05, 9.06, 9.1

See application file for complete search history.

(56) References Cited

U.S. PATENT DOCUMENTS

| | | | | |
|---|---|---|---|---|
| 5,579,117 | A | * | 11/1996 | Arsenault et al. ............. 358/296 |
| 5,903,362 | A | * | 5/1999 | Tanaka .......................... 358/468 |
| 2004/0148368 | A1 | * | 7/2004 | Reese et al. .................... 709/221 |
| 2007/0125843 | A1 | * | 6/2007 | Byerly et al. .................. 235/380 |
| 2008/0049255 | A1 | * | 2/2008 | Yokota .......................... 358/1.18 |
| 2008/0199235 | A1 | * | 8/2008 | Shoji et al. .................... 399/364 |
| 2011/0188912 | A1 | * | 8/2011 | Walsh ........................... 399/376 |

FOREIGN PATENT DOCUMENTS

| | | |
|---|---|---|
| JP | 11-249346 A | 9/1990 |
| JP | 08-063310 A | 3/1996 |

(Continued)

*Primary Examiner* — Daniel J Colilla
*Assistant Examiner* — Quang X Nguyen
(74) *Attorney, Agent, or Firm* — Canon USA, Inc. IP Division

(57) ABSTRACT

A print control apparatus may include a determination unit and a print control unit. The print control apparatus causes a printing unit to perform duplex printing on a continuous sheet and the determination unit determines whether a continuous sheet usable by a first print job is the same as a continuous sheet usable by a second print job. If the determination unit determines that the two continuous sheets are the same, the print control unit perform controls to, cause the printing unit to continuously print images of the first print job to be arranged on a first surface of the continuous sheet and images of the second print job to be arranged on the first surface and thereafter cause the printing unit to print images of the first print job and the second print job to be arranged on an opposite surface of the continuous sheet.

27 Claims, 7 Drawing Sheets

(56) References Cited

FOREIGN PATENT DOCUMENTS

| JP | 2001106406 A | * | 4/2001 |
| JP | 2004-106287 A | | 4/2004 |
| JP | 2005015066 A | | 1/2005 |
| JP | 2005313522 A | * | 11/2005 |
| JP | 2006-256138 A | | 9/2006 |
| JP | 2008126530 A | * | 6/2008 |
| JP | 2009066815 A | * | 4/2009 |
| JP | 2009226758 A | * | 10/2009 |

* cited by examiner

FIG. 6A
FIG. 6B
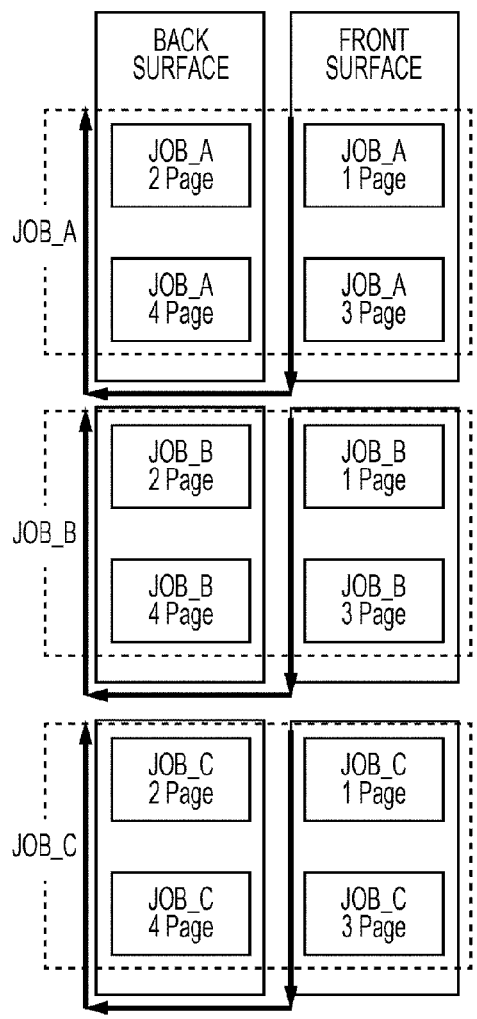
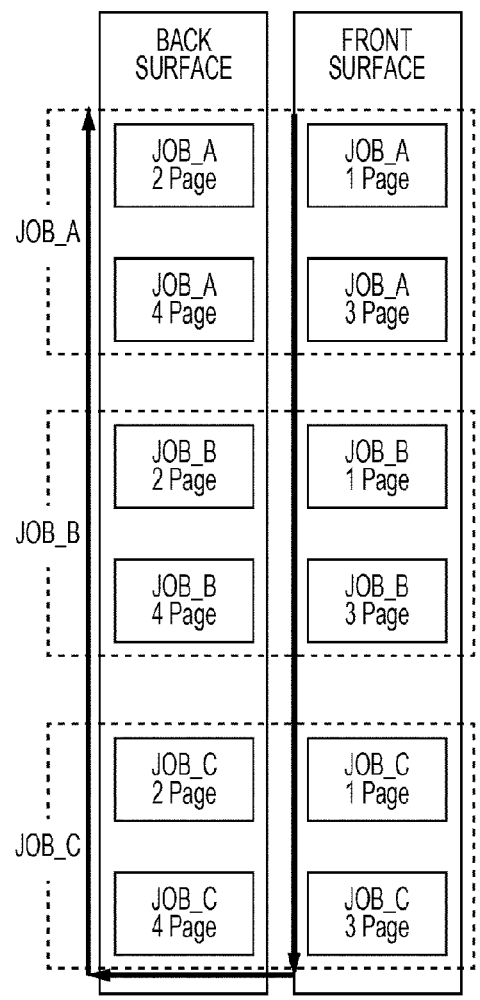

| MATERIAL OF SHEET | MAXIMUM LENGTH OF REWOUND SHEET |
|---|---|
| PLAIN PAPER | 60 m (MAXIMUM LENGTH ALLOWABLE FOR APPARATUS) |
| RECYCLED PAPER | 55 m |
| THIN PAPER | 50 m |
| THICK PAPER | 40 m |
| COAT PAPER | 30 m |
|  |  |

US 9,290,012 B2

PRINT CONTROL APPARATUS AND METHOD FOR DUPLEX PRINTING ON A CONTINUOUS SHEET

BACKGROUND OF THE INVENTION

1. Field of the Invention

The present invention relates to a print control apparatus and a print control method for performing printing on a continuous sheet.

2. Description of the Related Art

When performing printing on both sides of a continuous sheet, such as a roll sheet, some printing apparatuses perform printing on one of the surfaces of a continuous sheet fed into a printing unit and cut the sheet. Thereafter, the printing apparatuses temporarily wind the cut continuous sheet and feed the sheet into the printing unit again. Thus, the other surface of the sheet is printed (refer to, for example, Japanese Patent Laid-Open No. 11-249346). In such printing apparatuses, in order to perform efficient printing, a plurality of pages are printed on one of the two surfaces of the sheet. After the printing of the plurality of pages is completed, printing is performed on the other surface of the sheet.

In such a printing procedure, if a plurality of duplex print jobs are received, the sheet is turned over every time each of the print jobs is executed. That is, a plurality of images of a first job are sequentially printed on the front surface of the sheet, and the sheet is cut. Thereafter, the sheet is turned over. A plurality of images are printed on the back surface of the sheet, and the sheet is cut. Subsequently, in the same manner, a plurality of images of a second duplex print job are sequentially printed on the front surface of the sheet, and the sheet is cut. Thereafter, the sheet is turned over. A plurality of images are printed on the back surface of the sheet. Accordingly, when a plurality of duplex print jobs are executed, it is necessary to reverse the front and back surfaces of the sheet and cut the sheet a plurality of times. As a result, much time is needed before the printing operation is completed.

SUMMARY OF THE INVENTION

According to an embodiment, a print control apparatus includes a determination unit and a print control unit. The print control apparatus causes a printing unit to perform duplex printing on a continuous sheet and the determination unit determines whether a continuous sheet usable by a first print job is the same as a continuous sheet usable by a second print job. If the determination unit determines that the two continuous sheets are the same, the print control unit perform controls to, cause the printing unit to continuously print images of the first print job to be arranged on a first surface of the continuous sheet and images of the second print job to be arranged on the first surface and thereafter cause the printing unit to print images of the first print job and the second print job to be arranged on an opposite surface of the continuous sheet.

Further features will become apparent from the following description of exemplary embodiments with reference to the attached drawings.

BRIEF DESCRIPTION OF THE DRAWINGS

FIGS. 6A and 6B illustrate the order in which pages of a plurality of print jobs are printed.

DESCRIPTION OF THE EMBODIMENTS

Embodiments are described below with reference to the accompanying drawings. Note that the relative positional relationship among components of an apparatus according to the embodiments and the shapes of the components are only illustrative. The relative positional relationship among the components and the shapes of the components are not limited to those of the embodiments.

Figure 1:
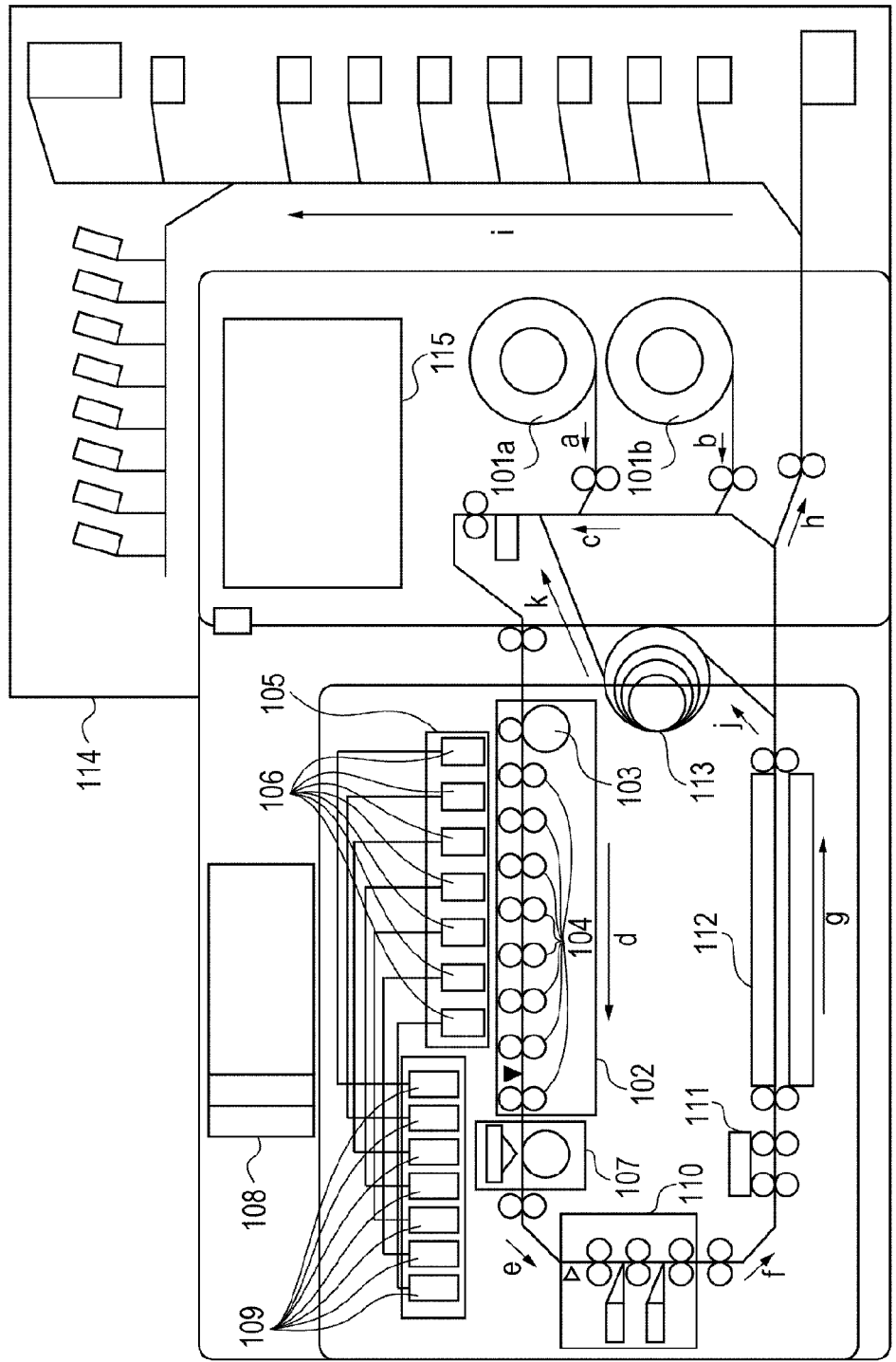
FIG. 1 illustrates an exemplary configuration of an image forming apparatus according to an embodiment.

FIG. 1 is a schematic illustration of an exemplary configuration of an image forming apparatus, which is an example of a print control apparatus according to the present embodiment. The image forming apparatus shown in FIG. 1 has only a print function of printing data received from an external apparatus. However, the apparatus may further include a reading unit for reading an image in a document and function as a copier. Alternatively, the apparatus may be a multi function peripheral having additional functions.

An example of a recording material (a recording medium or a recording sheet) used in the printing process is a roll sheet. A roll sheet is an example of a continuous sheet. However, the continuous sheet is not limited to a roll sheet. In addition, the continuous sheet may be automatically cut by the image forming apparatus or may be cut when a user manually instructs the image forming apparatus to do so. The recording material is not limited to paper. A variety of materials that are printable can be used as the recording material. Furthermore, the image forming apparatus that can perform printing on cut sheets having a predetermined size in addition to a continuous sheet may be used.

In addition, while the present embodiment is described below with reference to an inkjet image printing method using liquid ink for image printing, the method is not limited thereto. For example, solid ink may be used as a recording agent applied to a recording material. Alternatively, a variety of printing methods, such as an electrophotographic printing method using toner, a sublimation printing method, a thermal transfer printing method, and a dot impact printing method can be employed. In addition, while the present embodiment is described with reference to color recording using recording agents of a plurality of colors, monochrome printing using only a black color (including grey) can be used. In addition, printing is not limited to printing of a visual image. For example, printing of an invisible image or a barely visible image can be applied. Instead of a normal image, a wiring pattern, a physical pattern for manufacturing parts, or the base arrangement of a DNA, for example, may be printed. That is, the present embodiment is applicable to any image forming apparatus that can apply a recording agent to a recording material. In addition, when the print operation of the image forming apparatus shown in FIG. 1 is controlled in response to an instruction received from an external apparatus connected to the image forming apparatus, the external apparatus serves as a print control apparatus.

FIG. 1 is a cross-sectional view schematically illustrating the configuration of an image forming apparatus using a roll sheet (a long continuous sheet that is longer than a unit of printing (a page) in the sheet conveying direction) as a recording material. The image forming apparatus includes the following units 101 to 115, which are disposed in the housing of the image forming apparatus. However, these units may be separately disposed in a plurality of housings.

A control unit 108 includes a controller (including a central processing unit (CPU) or a microprocessing unit (MPU)), an output unit that outputs user interface information (e.g., a generator of display information and audio information), and a sub-controller including a variety of I/O interfaces. The control unit 108 performs overall control of the image forming apparatus.

The image forming apparatus further includes an upper sheet cassette 101a and a lower sheet cassette 101b serving as units that hold a roll sheet and supply the sheet. A user mounts a roll sheet (hereinafter simply referred to as a "sheet") in a magazine and loads the magazine to the body of the image forming apparatus. A sheet drawn from the upper sheet cassette 101a is conveyed in the direction indicated by "a" in FIG. 1, while a sheet drawn from the upper sheet cassette 101b is conveyed in the direction indicated by "b" in FIG. 1. The sheet drawn from either sheet cassette advances in the direction indicated by "c" in FIG. 1 and reaches a conveying unit 102. The conveying unit 102 conveys the sheet in the direction indicated by "d" in FIG. 1 (the horizontal direction) using a plurality of rotary rollers 104 during a print operation. When one of an upper sheet cassette 101a and a lower sheet cassette 101b that supplies the sheet is switched to the other, the sheet that has already been drawn out is rewound back into the cassette, and a new sheet is supplied from the other cassette.

A head unit 105 is disposed above the conveying unit 102 so as to face the conveying unit 102. In the head unit 105, a plurality of separate print heads 106 of a plurality of colors (seven in the present embodiment) are disposed along the sheet conveying direction. According to the present embodiment, the head unit 105 includes seven print heads 106 each corresponding to one of the following seven colors: cyan (C), magenta (M), yellow (Y), light cyan (LC), light magenta (LM), grey (G), and black (K). However, it should be noted that another color may be used, or any one or any combination of those colors may be used.

The image forming apparatus ejects ink from the print heads 106 in synchronization with conveyance of the sheet performed by the conveying unit 102. Thus, an image is formed on the sheet. Note that the print heads 106 are disposed at positions at which the ejection points of the print heads 106 do not overlap with the plurality of rotary rollers 104. Instead of directly ejecting ink to the sheet, an image may be formed by applying ink to an intermediate transfer member and, subsequently, applying the ink to the sheet.

The conveying unit 102, the head unit 105, and the print heads 106 form a unit for printing in the present embodiment.

Ink tanks 109 independently store ink of the respective colors. The stored ink is supplied from the ink tanks 109 to sub-tanks corresponding to respective colors through tubes. Subsequently, each of the color inks is supplied from the sub-tank to one of the print heads 106 corresponding to the color through a tube.

Each of the print heads 106 is in the form of a line head of one of the colors (seven in the present embodiment). The print heads 106 are arranged along the conveying direction d in which the sheet is conveyed during a print operation. The line head of each color may be formed from a single seamless nozzle chip. Alternatively, separate nozzle chips may be regularly arranged in a line or a zigzag pattern. According to the present embodiment, a head known as a full multi-head is employed. A full multi-head has nozzles arranged so as to cover the width of the print area of a sheet having a maximum size usable for the image forming apparatus. In an inkjet printing method, ink is ejected from a nozzle. Ink may be ejected using a heating element, a piezoelectric element, an electrostatic element, or a microelectromechanical system (MEMS) element. Ink is ejected from the nozzles of each head on the basis of print data at timing determined by the output signal output from a conveying encoder 103. After an image is formed on the sheet, the sheet is conveyed from the conveying unit 102 to a scanner unit 107. In the scanner unit 107, the image printed on the sheet or a predetermined pattern is optically read, and inspection to determine whether the image has been correctly printed is carried out. In addition, the state of the image forming apparatus (e.g., the ink ejection state) is inspected. In order to inspect the print state of an image, the ink ejection state may be inspected by reading a pattern for inspecting the head state, or the printed image may be inspected by comparing the image with an original image. That is, in order to inspect the print state of an image, one of a variety of inspection methods can be selected as appropriate.

The sheet located in the vicinity of the scanner unit 107 is conveyed in a direction e and is led into a cutter unit 110. The cutter unit 110 cuts the sheet into cut sheets each having a predetermined length of a unit of printing. The predetermined length of a unit of printing varies in accordance with the printed image size. For example, the length of an L size photo in the conveying direction is 135 mm, and the length of an A4 size photo in the conveying direction is 297 mm. In a simplex print mode, the cutter unit 110 cuts the sheet on a per page basis. However, for some print jobs, the cutter unit 110 does not cut the sheet on a per page basis. In a duplex print mode, the cutter unit 110 allows images to be continuously printed on a first surface of the sheet (the surface on which images are to be printed for a first time, e.g., the front surface) for a predetermined length without cutting the sheet. After images are printed on a second surface (the surface on which images are to be printed for a second time, e.g., the back surface), the sheet is cut into pages. Note that the cutter unit 110 does not necessarily cut the sheet into pages in a simplex print mode or in back surface printing in a duplex print mode. For example, images may be printed until a predetermined length of the sheet is conveyed. After a predetermined length of the sheet has been conveyed, the sheet may be cut. Thereafter, a different cutter unit may cut the sheet into images (pages) by, for example, a manual operation. In addition, if a cutting operation in the width direction of the sheet is needed, the cutting operation is performed using a different cutter unit.

The sheet is conveyed from the cutter unit 110 to a back surface printing unit 111 inside the image forming apparatus in a direction f shown in FIG. 1. The back surface printing unit 111 is used to print predetermined information on the back surface of the sheet when an image is printed on only one surface of the sheet. Examples of the information printed on the back surface of the sheet include characters, a symbol, or code corresponding to each of the printed image (e.g., an order management number). When the print heads 106 print an image for a duplex print job, the back surface printing unit 111 prints the above-described information in an area into which the print heads 106 do not print the image for the duplex print job. The back surface printing unit 111 can employ a recording agent stamp method, a thermal transfer print method, or an inkjet print method.

After the sheet has passed through the back surface printing unit 111, the sheet is conveyed to a drying unit 112. The drying unit 112 heats the sheet passing therethrough in a direction g shown in FIG. 1 using heated air (heated gas) so as to dry the sheet having ink applied thereon in a short time. Instead of using heated air, the sheet may be dried by using, for example, cold air, direct heating of a heater, natural drying, or electromagnetic radiation (e.g., ultraviolet ray radiation). The sheet is cut into the cut sheets each having a length of a unit of printing, and the cut sheets passes through the drying unit 112 one by one. Each of the cut sheets is conveyed in a direction h shown in FIG. 1 and reaches a sort unit 114.

The sort unit 114 includes a plurality of trays (18 trays in the present embodiment). The sort unit 114 selects one of the trays to which the sheet is to be output in accordance with, for example, the length of the unit of printing. Each of the trays has a tray number. The sort unit 114 determines whether the tray is empty or full using a sensor disposed in each of the trays and ejects the sheet passing through the sort unit 114 in a direction i shown in FIG. 1 onto the tray having a tray number set for each of the printed image. The tray onto which a cut sheet is to be ejected is specified by the submitter of a print job (i.e., a host apparatus). Alternatively, an available tray may be selected by the image forming apparatus. A predetermined number of sheets can be output to one of the trays. If the number of output sheets of a print job is greater than the predetermined number, the sheets are output onto a plurality of trays. The number of ejectable sheets, the size of an ejectable sheet, and the type of an ejectable sheet vary in accordance with the size (the type) of the tray. In FIG. 1, the trays arranged in the vertical direction (hereinafter referred to as "large trays") allow a large size sheet (e.g., an A4 size or a size larger than an L size) and a small size sheet (an L size) to be ejected thereto. In contrast, the trays arranged in the horizontal direction (hereinafter referred to as "small trays") allow a small size sheet (an L size) to be ejected thereto, but not a large size sheet. In addition, the large tray has a sheet capacity larger than that of the small tray.

Furthermore, the user can recognize the state of the tray, such as the state in which sheets are being output or output of sheets has been completed, using an indicator (e.g., a light emitting diode (LED)). For example, a plurality of LEDs having different colors are disposed on each of the trays. The image forming apparatus can inform the user of the state of each of the trays by turning on an LED having a particular color or turning on, turning off, or making the LED blink. In addition, the plurality of trays can be prioritized. When executing print jobs, the image forming apparatus sequentially selects an empty tray (having no sheets) as a tray to which sheets are to be output in accordance with the priorities. By default, an upper large tray has a priority higher than that of the lower large tray, and a small tray on the left has a priority higher than a small tray on the right. The priority of a small tray is higher than that of a large tray. The priorities may be changed in advance so that a tray located at a position at which the user can more easily collect the sheets has a higher priority. Alternatively, the user may manually change the priorities as needed.

A sheet winding-up unit 113 winds up the sheet having a printed first surface and not being cut into an individual page. In a duplex print mode, a sheet with a front surface having images formed thereon is not cut into an individual page by the cutter unit 110. The sheet is cut after continuous printing on the front surface is completed. The sheet with the printed front surface passes through the sheet winding-up unit 113 in a direction j shown in FIG. 1 and is wound up by the sheet winding-up unit 113. Thus, image formation of a series of pages on the front surface is completed, and the sheet is wound up. Subsequently, the wound up sheet is conveyed again in the sheet winding-up unit 113 in a direction k shown in FIG. 1 such that the surface opposite the front surface serves as a printable surface, that is, the surface that faces the print heads 106 is reversed. In this manner, printing of images on the back surface that is opposite the front surface having the images printed thereon is available. Note that in a simplex print mode, a sheet having an image printed thereon is conveyed to the sort unit 114 without being wound up by the sheet winding-up unit 113.

As described above, in a duplex print mode, the sheet is wound up by the sheet winding-up unit 113, the sheet is turned over, and the back surface is printed. Accordingly, in a duplex print mode, the side of the sheet ejected to the sort unit 114 differs from that in a simplex print mode. That is, in a simplex mode, a sheet is not turned over by the sheet winding-up unit 113. Therefore, the sheet having the image of a first page printed thereon is ejected with the image of the first page facing downward. If a print job has a plurality of pages, the sheets starting from the sheet of a first page are sequentially ejected to the tray and are stacked in the tray. As used herein, such ejection is referred to as "face-down ejection". In contrast, in a duplex print mode, the sheet is turned over by the sheet winding-up unit 113. Therefore, the sheet having the image of a first page printed thereon is ejected with the image of the first page facing upward. If a print job has a plurality of pages, the sheets starting from the sheet of the last page are sequentially ejected to the tray and are stacked in the tray. As used herein, such ejection is referred to as "face-up ejection". Note that in order to make the side of the sheet ejected in a duplex mode the same as that in a simplex mode (i.e., in order to use one of face-up ejection and face-down ejection in both print modes), the order in which the pages are printed on the first surface in a duplex print mode may be changed from that in a simplex mode (i.e., in ascending order or descending order).

An operation unit 115 is used when the user performs a variety of operations and the image forming apparatus informs the user of various information. For example, by using the operation unit 115, the user can recognize the print state for each order, such as a tray having a sheet including an image specified by the user stacked thereon and a state indicating whether the image is being printed or has already been printed). In addition, the user can operate the operation unit 115 to check the state of the image forming apparatus, such as the remaining ink level and the remaining amount of sheet, and instruct starting of a maintenance operation, such as head cleaning.

Figure 2:
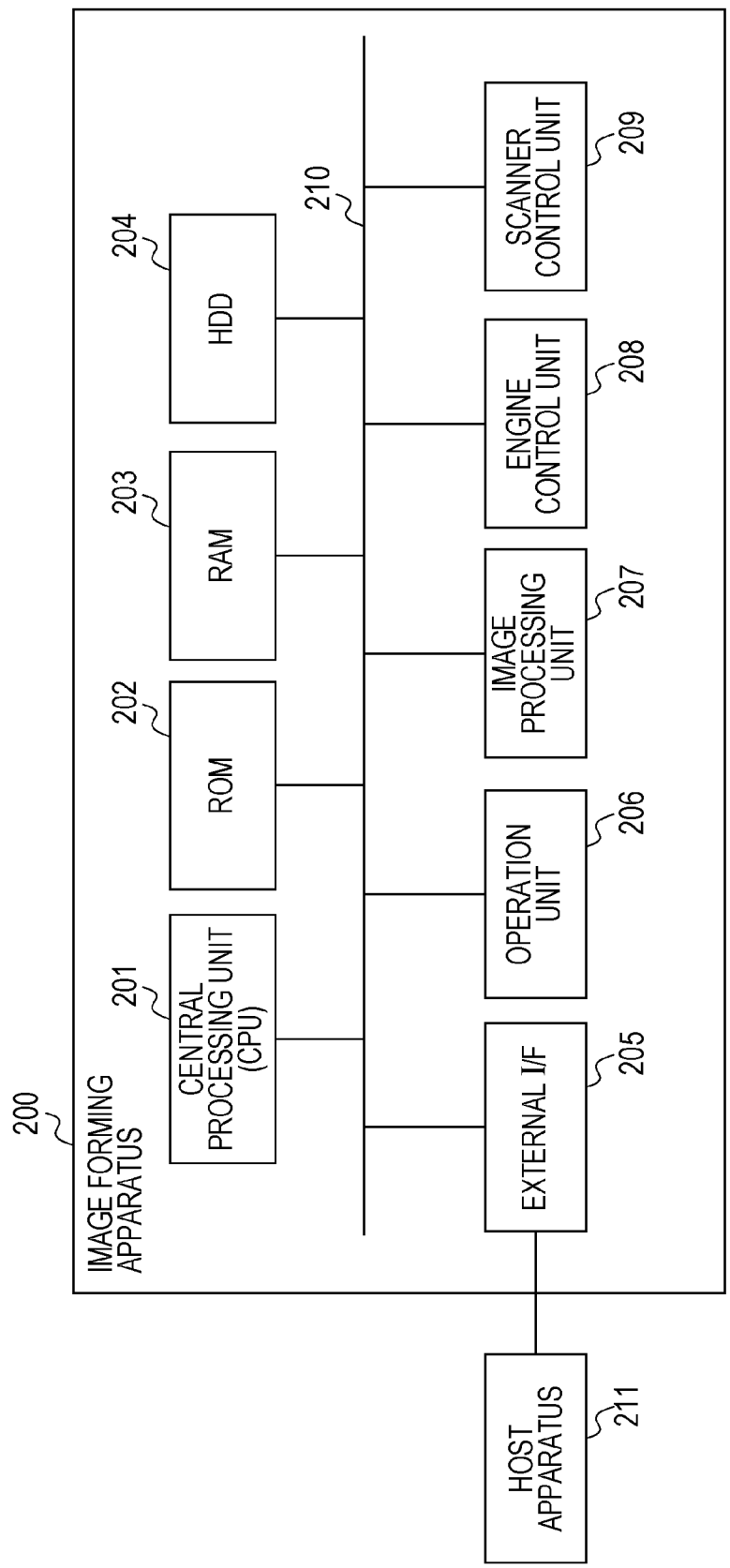
FIG. 2 is a block diagram illustrating the configuration related to the control operation performed by the image forming apparatus shown in FIG. 1.

FIG. 2 is a block diagram illustrating the configuration related to the control operation performed by the image forming apparatus shown in FIG. 1. An image forming apparatus 200 is the same as the image forming apparatus shown in FIG. 1. However, the following configuration is only an example. A variety of modifications can be made to the image forming apparatus 200.

The control unit 108 further includes a CPU 201, a read only memory (ROM) 202, a random access memory (RAM) 203, an image processing unit 207, an engine control unit 208, and a scanner control unit 209. In addition, a hard disk drive (HDD) 204, an operation unit 206, and an external interface (I/F) 205 are connected to the control unit 108 via a system bus 210.

The CPU 201 is a central processing unit in the form of a microprocessor (a microcomputer). The CPU 201 is included in the control unit 108 shown in FIG. 1. The CPU 201 performs overall control of the image forming apparatus 200 by executing programs and starting the operation of hardware. The ROM 202 stores programs executed by the CPU 201 and fixed data necessary for the image forming apparatus 200 to perform a variety of operations. The RAM 203 is used as a work area of the CPU 201 and a temporary storage area for a variety of received data items. In addition, the RAM 203 stores a variety of setting data items. The HDD 204 can store programs to be executed by the CPU 201, print data, and setting information necessary for the operation performed by the image forming apparatus 200 in an internal hard disk. In addition, the HDD 204 can read such data from the internal hard disk. Note that a different high-capacity storage unit may be employed in place of the HDD 204.

The operation unit 206 includes hard keys and a touch-sensitive panel used when the user performs a variety of operations and a display for presenting (sending) various information to the user. The operation unit 206 corresponds to the operation unit 115 shown in FIG. 1. Alternatively, information sent to the user may be in the form of sound (beep or voice) based on audio information output from a sound generator.

The image processing unit 207 performs expansion (conversion) from the print data processed by the image forming apparatus 200 (e.g., data written with a page description language) into image data (a bitmap image) and image processing. The image processing unit 207 converts the color space of the image data included in the input print data (e.g., YCbCr) into a standard RGB color space (e.g., sRGB). In addition, the image processing unit 207 performs a variety of image processing, such as resolution conversion into the effective number of pixels (the number of pixels printable by the image forming apparatus 200), image analysis, and image correction, on the image data as needed. Image data obtained through such image processing is stored in the RAM 203 or the HDD 204.

In response to a control command received from, for example, the CPU 201, the engine control unit 208 controls processing for printing an image based on the print data on the sheet. The engine control unit 208 instructs the print heads 106 for different colors to eject ink, sets ink ejection timing in order to adjust a dot position (an ink ejection target) on a recording medium, and performs control on the basis of the acquired head driving state. The engine control unit 208 controls driving of the print head in accordance with the print data and instructs the print head to eject ink so that an image is formed on the sheet. In addition, the engine control unit 208 instructs a pull-out roller to pull out a sheet from the cassette, instructs the conveying roller to convey the pulled-out sheet, acquires the rotation state of the conveying roller, and controls rotation of the conveying roller. In this way, the engine control unit 208 conveys the sheet along an appropriate path at appropriate speed and stops the sheet.

The scanner control unit 209 controls the image sensor in response to a control command received from, for example, the CPU 201. Thus, the scanner control unit 209 reads an image formed on the sheet and acquires red (R), green (G), and blue (B) analog luminance data. Thereafter, the scanner control unit 209 converts the analog luminance data into a digital format. A charge-coupled device (CCD) image sensor or a complementary metal-oxide semiconductor (CMOS) image sensor can be used as the image sensor. In addition, the image sensor may be a linear image sensor or an area image sensor. Furthermore, the scanner control unit 209 instructs the image sensor to read an image and receives the state of the image sensor after the image is read, analyzes the luminance data acquired from the image sensor, detects whether ink is properly ejected from the print heads 106, and detects the cut position in the sheet. After the scanner control unit 209 confirms that an image is correctly printed on the sheet, ink applied to the sheet is dried. Thereafter, the sheet is ejected onto the specified tray of the sort unit 114.

A host apparatus 211 corresponds to the above-described external apparatus. The host apparatus 211 is located outside the image forming apparatus 200 and is connected to the image forming apparatus 200. The host apparatus 211 serves as a source for supplying image data to be printed by the image forming apparatus 200. The host apparatus 211 submits the order of a variety of print jobs.

The host apparatus 211 may be a general-purpose personal computer (PC) or a data supply apparatus of another type. An example of the data supply apparatus is an image capturing device that captures an image and generates image data. Examples of the image capturing device include a reader (a scanner) that reads an image in a document and generates image data and a film scanner that reads a negative film or a positive film and generates image data. Examples of the image capturing device further include a digital camera that captures a still image and generates image data and a digital video camera that captures a moving image and generates moving image data. Still furthermore, examples of the data supply apparatus include a photo storage device disposed in a network or a removable portable memory connected to a socket of the image forming apparatus. The image file stored in the photo storage device or the removable portable memory is read and generated image data from the read image file, and printed the generated image data by the image forming apparatus. Instead of a general-purpose PC, the host apparatus 211 may be a exclusive used terminal device for the image forming apparatus. As described above, a variety of types of data supply apparatuses can be used as the host apparatus 211. The data supply apparatus may be a component of the image forming apparatus or an apparatus located outside the image forming apparatus and connected to the image forming apparatus. When a PC is used as the host apparatus 211, a storage unit of the PC stores an operating system (OS), application software that generates image data, and the printer driver of the image forming apparatus 200 installed therein. The printer driver controls the image forming apparatus 200. In addition, the printer driver converts the image data supplied from the application software into a format processible by the image forming apparatus 200 so as to generate print data. Alternatively, the host apparatus 211 may convert the print data into image data and may supply the image data to the image forming apparatus 200. However, it should be noted that all of the above-described processes are not necessarily realized by software. Some or all of the processes may be realized by hardware, such as an application specific integrated circuit (ASIC). The image data, various commands, and status signals can be exchanged between the host apparatus 211 and the image forming apparatus 200 via the external I/F 205. The external I/F 205 may be a local I/F or a network I/F. In addition, the external I/F 205 may be a wired interface or a wireless interface.

The above-described units of the image forming apparatus 200 are connected to one another via the system bus 210 so as to be communicable with one another.

While the foregoing example has been described with reference to the CPU 201 that performs overall control of the units of the image forming apparatus 200 shown in FIG. 2, the configuration is not limited thereto. For example, some of the functional blocks may include a dedicated CPU that independently controls the functional block. In addition, each of the functional blocks may be appropriately separated into independent processing units or control units or some of the functional blocks may be integrated in accordance with functional assignments different from those shown in FIG. 2. In this way, a variety of forms can be employed. In addition, in order to read data from a memory, a direct memory access controller (DMAC) can be used.

Figure 3:
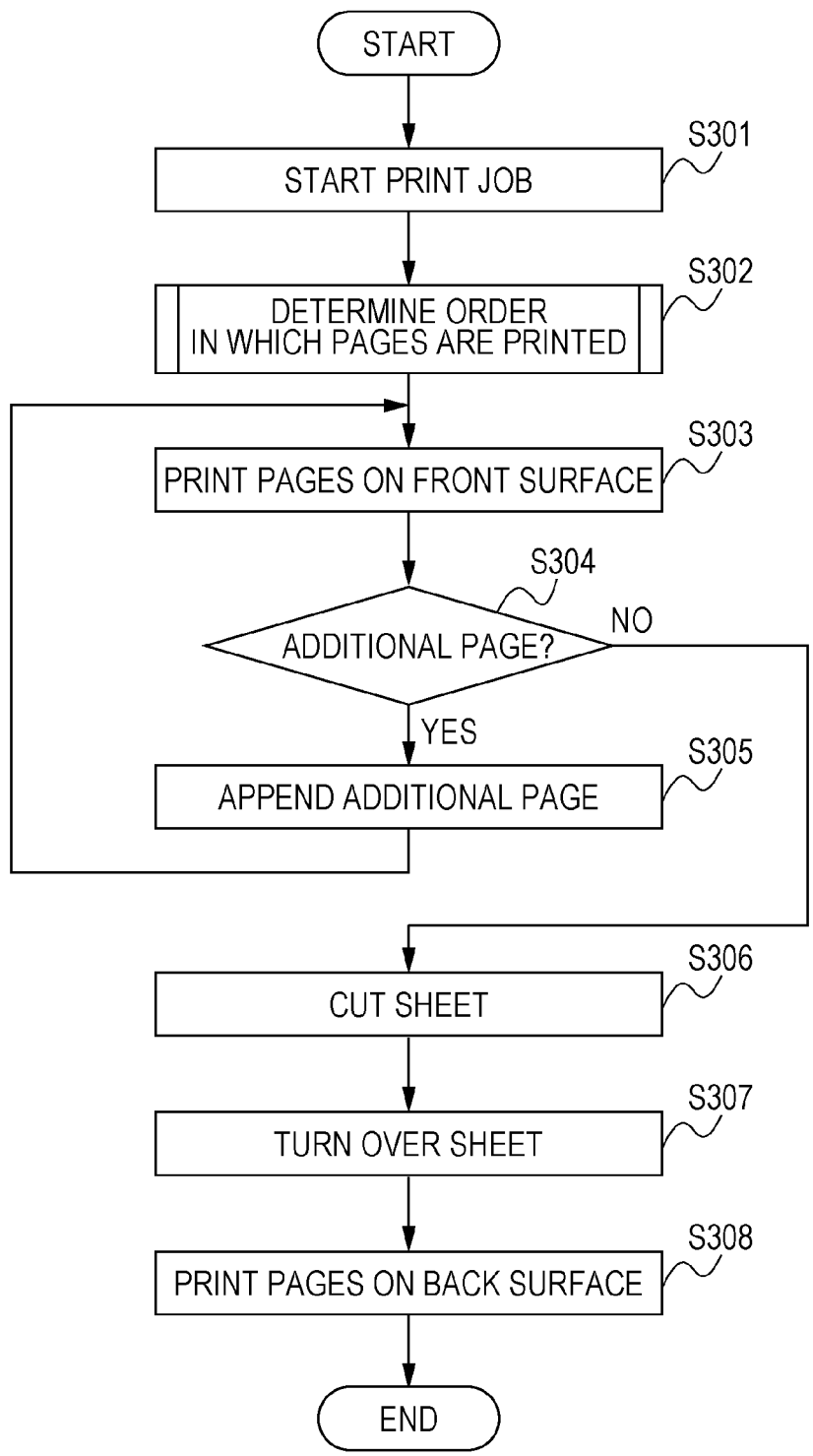
FIG. 3 is a flowchart of the processing according to an embodiment.

The flow of processing performed when the image forming apparatus 200 executes a print job in the above-described configuration is described next. FIG. 3 is a flowchart of processing performed when the image forming apparatus 200 receives a duplex print job and executes the print job. The flowchart indicates the flow of processing when the CPU 201 loads a control program stored in the ROM 202 or the HDD 204 into the RAM 203 and executes the control program. Note that the RAM 203 prestores information about the size (the roll width) and the sheet type (e.g., plain paper, glossy paper, or a film) of the sheet set in each of the sheet cassettes 101a and 101b. Such information is provided in advance by the user through the operation unit 206.

In step S301, upon receiving a print job via the external I/F 205, the CPU 201 starts processing of the print job. The received job is temporarily stored in the HDD 204. In step S302, the CPU 201 determines the order in which the pages of the print job are printed.

Figure 4:
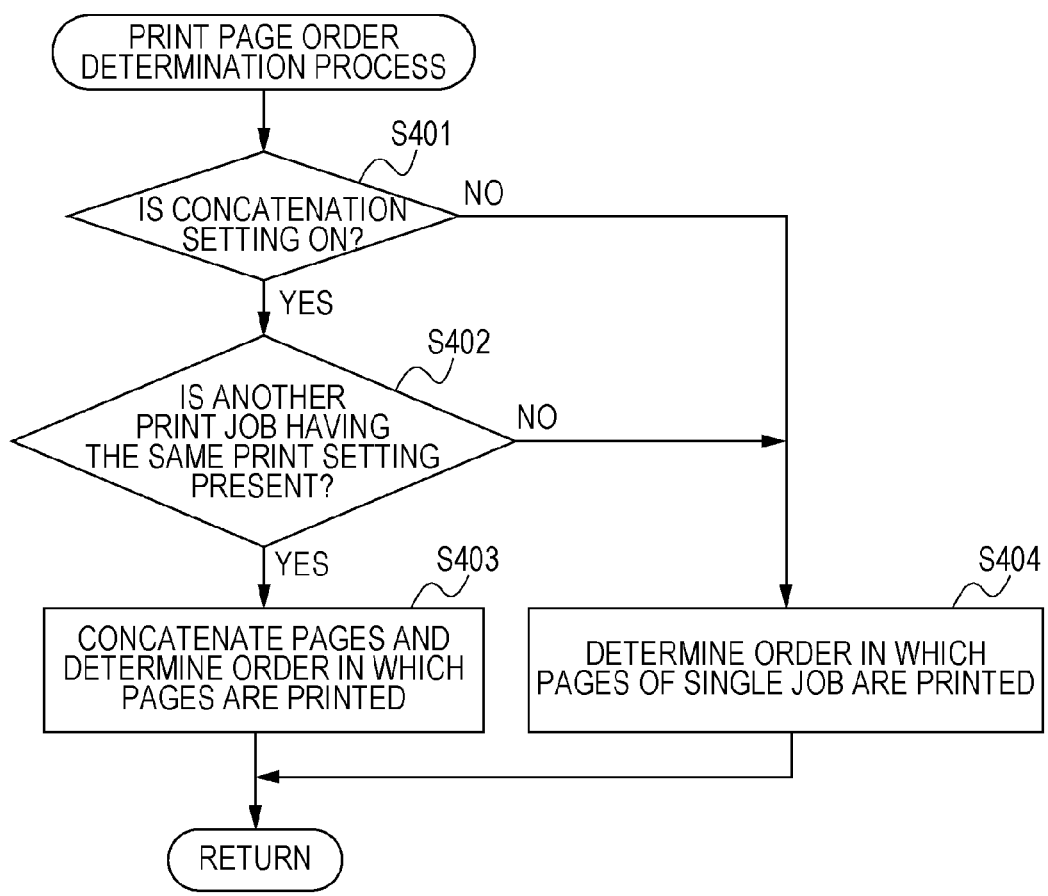
FIG. 4 is a flowchart of the processing according to the embodiment.

FIG. 4 is a flowchart of the detailed process performed in step S302.

When the image forming apparatus 200 continuously prints a plurality of print jobs, the image forming apparatus 200 can continue printing without cutting the sheet at the boundary between the print jobs (by concatenating the print data items). The user can determine whether the print data items of a plurality of print jobs are concatenated or not in such a manner (the concatenation setting is ON or OFF) through the operation unit 206. The concatenation setting (ON or OFF) determined by the user is stored in the RAM 203. In step S401, the CPU 201 refers to the concatenation setting stored in the RAM 203 and determines whether the concatenation setting is ON or OFF.

If the concatenation setting is OFF, the print data items of the plurality of print jobs are not concatenated. Accordingly, the processing proceeds to step S404, where the CPU 201 determines the order in which the pages in a single job are printed. The order in which the pages are printed is determined using the print layout (simplex printing, duplex printing, or the binding method of bookbinding printing). At that time, the position in the sheet at which the sheet is cut is also determined using the print layout and the print setting, such as the type of sheet (the size and the material of the sheet). As used herein, the term "size" refers to a two-dimensional size, such as the ISO A series or B series. Examples of the material of the sheet include plain paper and glossy paper.

In a duplex print mode, the order in which the pages are printed is determined so that pages are continuously printed on the same surface (the first surface) and, subsequently, pages are continuously printed on the surface opposite the first surface in the reverse order. For example, when print data for pages 1 to 6 are arranged on the front and back surfaces in the ascending order of their page numbers, images of pages 1, 3, and 5 are printed on the front surface in this order. Subsequently, the sheet is turned over. Images of pages 6, 4, and 2 are printed in this order. In contrast, if images are printed on the back surface first, the back surface is considered as a first surface, and images of pages 6, 4, and 2 are printed on the first surface in this order. Subsequently, the sheet is turned over. Images of pages 1, 3, and 5 are printed in this order. In the latter case, the sheets are ejected face-down as in a simplex print mode.

By applying the above-described page print order, the sheet is turned over only once. Thus, the job can be efficiently processed. When bookbinding printing is performed, the order in which pages are arranged may be different. However, the order in which the pages are printed is determined so that the pages on the same surface can be continuously printed.

However, if the print settings for the pages (the types of sheet) arranged in the same surface are different, the supply source of the sheets needs to be changed or the sheet may be changed. Accordingly, in a duplex printing, the pages to be arranged in the first surface and having the same print setting are continuously printed. Thereafter, when the print setting is changed, the sheet is cut at that time. Subsequently, the opposite surface is printed. A new sheet is supplied, and the subsequent printing is performed.

Therefore, according to the present embodiment, it is determined whether only the type of sheet among various print settings for the print job is changed or not. Even when the other settings are changed, it is determined that the pages are continuously printed. That is, the types of sheet for neighboring (adjacent) images to be arranged on the same surface (the first surface) of the sheet are compared with each other, and it is determined whether the sheets to be used are the same.

In contrast, in a duplex print mode, the print setting for the opposite surface needs to be the same as that for the first surface. If the print setting for the first surface differs from that for the opposite surface in terms of a sheet type, an error is reported before processing of the print job is started. Accordingly, in this step, only the sheet types of the neighboring images formed on the first surface are compared with each other.

In addition, in this step, the print settings in terms of only a sheet type are compared. However, if setting in terms of other setting (e.g., an image quality mode) indicating that continuous printing needs to be stopped is made, it may be determined that the sheets to be used are not the same.

If, in step S401, it is determined that the concatenation setting is ON, the processing proceeds to step S402. In step S402, the CPU 201 determines whether another print job having the same print setting (the print layout may differ) is stored in the HDD 204. That is, since the image forming apparatus 200 sequentially receives subsequent print jobs and stores the print jobs in the HDD 204, the CPU 201 searches the print jobs for such a print job.

First, the print setting (the sheet type) of the last page of the current job printed on the first surface is compared with the print setting (the sheet type) of a first page of the subsequent job to be printed on the first surface. If the two print settings are the same, the subsequent job is continuously printed. In the same manner, the next pages of the subsequent job to be printed on the first surface are sequentially compared with the current page and the same process is performed.

Suppose that each of the current job (job A) and the subsequent job (job B) has six pages 1 to 6 and the pages 1 to 6 are alternately printed on the front surface and the back surface (pages 1,3, and 5 are printed on the first surface). Then, the print settings of the pages are compared in the following order. That is, in terms of the print setting, page 5 of the job A is compared with page 1 of the job B. If the print settings are the same, page 1 of the job B is compared with page 3 of the job B. If the print settings are the same, page 3 of the job B is compared with page 5 of the job B. That is, the print settings of the neighboring pages to be printed on the same surface (the first surface) are compared with each other so that it is determined whether the same sheet can be used.

In step S403, on the basis of the above-described comparison, the CPU 201 concatenates the continuous pages having the same print settings in terms of the sheet type. When a page having different print setting appears, the page is not included in a group of the continuously printed pages. Pages subsequent to the page not included in the group are stored in the HDD 204 as the subsequent group.

When the above-described processing is completed, the processing returns to step S303 of the flow shown in FIG. 3. Note that in FIG. 4, the print jobs submitted from a variety of users on a plurality of host apparatuses in the network are to be subjected to the concatenation process. That is, if the print settings in terms of the sheet type are the same, the jobs are to be subjected to the concatenation process even when the jobs are submitted by different users. As used herein, such a series of pages to be continuously printed is referred to as a "job group".

In step S303, printing on the first surface (the front surface in this example) is started using the page sequence determined in the process shown in FIG. 4. That is, the CPU 201 supplies the print data of each page to the image processing unit 207 in accordance with the determined print order. The image processing unit 207 converts the print data to be printed on the front surface into a printable format (an expansion process into image data). Thereafter, the image processing unit 207 stores the image data in the HDD 204. Subsequently, the image processing unit 207 supplies the generated image data to the engine control unit 208 in the order of the pages. At that time, information indicating on which surface of the sheet the image data is to be printed, to which page the image data corresponds, and identification of the print job are sent to the engine control unit 208 together with the image data.

Upon receiving the image data, the engine control unit 208 instructs the sheet cassette 101a or 101b that contains a sheet having a size and a sheet type to be used to feed the sheet. In addition, the engine control unit 208 instructs the conveying unit 102 to convey the sheet to the print position of the head unit 105, instructs the head unit 105 to sequentially print images based on the image data on the front surface of the sheet, and instructs the conveying unit 102 to convey the sheet to a reading position of the scanner unit 107. Thereafter, it is determined whether the images are correctly printed on the basis of image data acquired by reading the printed images using the scanner unit 107. The sheet is conveyed to the cutter unit 110. If it is determined that the images have been correctly printed, cutting on a per page basis is not performed by the cutter unit 110. The sheet having continuous pages printed thereon passes through the drying unit 112 so that the ink is dried. Thereafter, the sheet is wound up by the sheet winding-up unit 113. However, if it is determined that the images are not correctly printed, the CPU 201 instructs the cutter unit 110 to cut the sheet on a per page basis and eject an incorrectly printed page. The cut sheet having an incorrectly printed page is ejected onto a tray for incorrect printouts among the trays of the sort unit 114 (e.g., the lowermost tray). Thereafter, the CPU 201 supplies the image data to the engine control unit 208 again in order to reprint the incorrectly printed page. Subsequently, the above-described processes are repeated.

As described above, while images are being printed on the front surface in step S303, it is concurrently determined in step S304 whether a page to be added is present or not. This is because it is efficient to continuously print the job since the image forming apparatus 200 sequentially receives a new print job and stores the received print job in the HDD 204 while printing is being performed on the basis of the determined print order.

Figure 5:
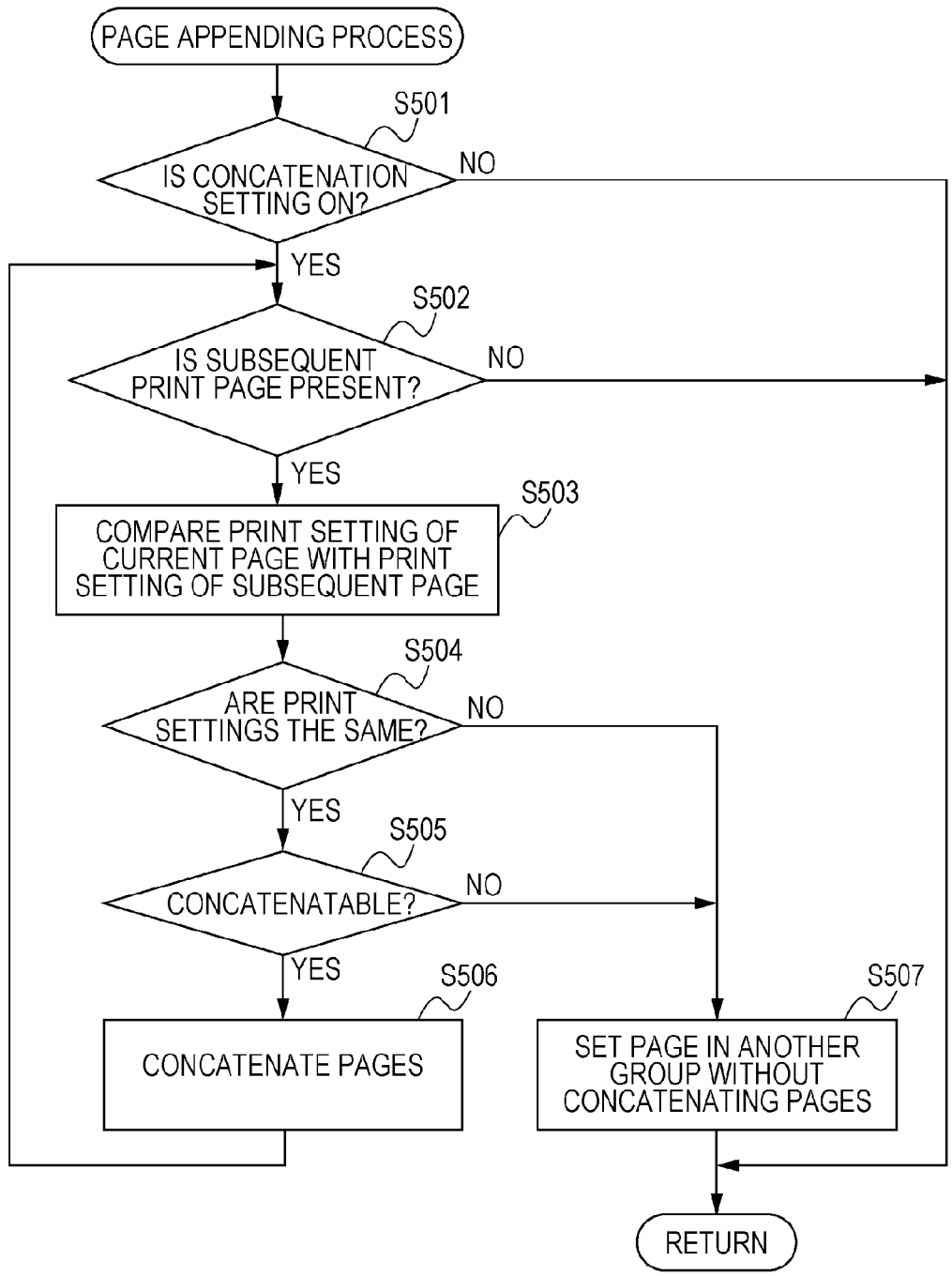
FIG. 5 is a flowchart of the processing according to the embodiment.

FIG. 5 is a flowchart of the detailed process performed in step S304.

In step S501, the CPU 201 refers to the setting information stored in the RAM 203 and determines whether the concatenation setting is ON or OFF. If the concatenation setting is OFF, the pages of different jobs are not concatenated. Accordingly, the processing returns to the flow shown in FIG. 3.

However, if the concatenation setting is ON, the processing proceeds to step S502, where the CPU 201 determines whether the subsequent job is present or not. In this example, it is determined that the next page to be printed is present when the order in which pages are printed has already been determined in step S302 and if the last page on the first surface of the job group being printed in step S303 is the last page of the print job and the subsequent print job is stored in the HDD 204. If pages have been concatenated during execution of a single print job, a print job prior to the print job is not completed unless a page subsequent to the print job is printed first. Accordingly, in such a case, it is determined that the subsequent page to be printed is not present. However, when a plurality of print jobs are waiting and it is determined that execution of the print jobs are completed earlier if the subsequent print job is executed first, the page of the subsequent job may be concatenated even when the pages have already been concatenated in the preceding print job. If the subsequent print job is not stored in the HDD 204, it is also determined that the next page to be printed is not present. If it is determined that the next page to be printed is not present, the processing returns to the flow shown in FIG. 3.

If, in step S502, it is determined that the next page to be printed is present, the processing proceeds to step S503, where the CPU 201 compares the print setting of the last page on the first surface of the current job group in terms of the sheet type with the print setting of the first page on the first surface of the subsequent print job in terms of the sheet type.

If, in step S504, it is determined that the compared print settings are the same, the processing proceeds to step S505, where the CPU 201 determines whether the pages can be concatenated with each other. In this determination, the number of images (pages) arranged in the same surface is determined so that the total length of images arranged on the same surface does not exceed a predetermined length using the following criteria (1) to (3):

(1) The length of the sheet for a job group does not exceed a predetermined length. This is because if the length is too large, the completion of the preceding print job is delayed.
(2) The length of the sheet for a job group does not exceed the length of the remaining sheet. This is because if the remaining sheet is not sufficient, the printing operation is stopped even when criterion (1) is satisfied.
(3) The tray of the sort unit 114 to be used for the job group is available. This is because if the tray is not available, the printing operation is stopped.

If these criteria are satisfied, the processing proceeds to step S506, where the pages are concatenated as illustrated in FIG. 4 and the concatenated pages are appended to the current job group. Thereafter, the processing returns to step S502, where a target page is switched as illustrated in FIG. 4 and the processing continues.

If, in step S504, it is determined that the print settings in terms of the sheet type are not the same or if, in step S505, it is determined that the pages are not concatenatable, the processing proceeds to step S507, where it is determined that the pages subsequent to the target page belong to a different group. Thereafter, the processing returns to the flow shown in FIG. 3.

In step S305, the CPU 201 appends the pages determined as additional pages in the flow shown in FIG. 5 to the print pages currently being printed. Thereafter, the process in step S303 is repeated.

When printing of all of the pages on the front surface in step S303 is completed and if an additional page is not present, the processing proceeds to step S306. In step S306, the CPU 201 instructs the cutter unit 110 to cut the sheet having the printed pages on the front surface. In step S307, the sheet having the printed pages on the front surface that has been wound up by the sheet winding-up unit 113 is re-fed to the conveying unit 102 with the surface opposite the first surface facing the head unit 105. In step S308, printing on the back surface is performed. Since the printing on the back surface is similar to that on the front surface, description thereof is not repeated. However, during printing on the back surface, the sheet is cut on a per page basis (or sometimes on a two-page basis for bookbinding printing) by the cutter unit 110. The cut sheets are ejected to the tray of the sort unit 114.

Subsequently, in order to execute the subsequent print job that is determined to belong to a different job group in the flow illustrated in FIGS. 4 and 5, the processing in accordance with the flowchart shown in FIG. 3 is repeated for a print job stored in the HDD 204. At that time, the sheet set in the cassette other than the cassette used for the preceding print job or a new sheet set in the cassette used for the preceding print job is used.

FIG. 6B illustrates the order in which pages are printed when the pages are concatenated in the above-described manner. Different jobs A, B, and C are input, and the image forming apparatus 200 is instructed to print pages of the jobs in an arrangement shown in FIG. 6B. The print settings of the pages arranged in the same surface in terms of the sheet type are the same.

If the pages are concatenated (a job group is generated) in accordance with the processes illustrated in FIGS. 3 to 5, the pages are arranged as follows. That is, the first page of the job A, the third page of the job A, the first page of the job B, . . . , and the third page of the job C are printed and, subsequently, the sheet is cut and turned over. Thereafter, the fourth page of the job C, the second page of the job C, . . . , and the second page of the job A are sequentially printed. Accordingly, when three print jobs are executed, the sheet is cut and turned over only once.

However, if each of the print jobs is executed without performing the processes illustrated in FIGS. 3 to 5, the procedure illustrated in FIG. 6A is applied. That is, the first page and third page of the job A are printed and, subsequently, the sheet is cut and turned over. Thereafter, the fourth page and second page of the job A are printed. At that time, the sheet cassette that has supplied the sheet for the job A rewinds the sheet after the sheet has been cut. Thereafter, the sheet cassette restarts supplying the sheet for the job B. The first page and third page of the job B are printed and, subsequently, the sheet is cut and turned over. Thereafter, the fourth page and second page of the job B are printed. The sheet is rewound and re-supplied. Thereafter, a similar operation is performed for the job C. Accordingly, in this case, in order to execute three jobs, the sheet is cut and turned over three times. In addition, the sheet cassette rewinds and re-supplies the sheet at least twice.

As described above, according to the present embodiment, the number of sheet cuts, turnovers, rewinds, and re-supplies can be minimized. Thus, a plurality of print jobs can be significantly efficiently executed.

While the above description has been made with reference to job connection among a plurality of duplex print jobs, a duplex print job may be concatenated to a simplex print job. Alternatively, a plurality of simplex jobs may be concatenated together. Even when a plurality of simplex jobs may be concatenated together, the number of rewinds and re-supplies of the sheet can be reduced and, therefore, the processing can be facilitated.

In addition, while the above description has been made with reference to job concatenation among print jobs having the sheet setting of the same size and type, the sizes may differ from one another. If a sheet having a smaller size in the width direction is used, either end portion of the sheet can be cut. Accordingly, when the size (width) of the sheet for the subsequent print job is smaller than that for the current print job, the jobs can be concatenated to each other. That is, in the example shown in FIG. 6, when the sheet size of the job A is A4 and the sheet size of the job B is B5 and the sheet size of the job C is A4, these jobs can be set in the same job group. Alternatively, when the subsequent print job can use a plurality of sheet sizes and if one of the sheet sizes is the same as the sheet size used by the current job, it can be determined that the same sheet size is used and the jobs can be concatenated into a job group. This also applies to the type of sheet. In addition, when a job group is determined before the current job is started and if each of the current job and the subsequent job can use a plurality of types of sheet, the jobs can be set in the same job group by using the same types of sheet.

In addition, in the above description, priorities may be assigned to the print jobs, and the order in which the print jobs are executed or whether job connection is performed or not may be changed. For example, if the priority of the current job is higher than that of the subsequent job, the subsequent job is not concatenated to the current job. In this way, a print job having a higher priority can be completed earlier.

In addition, in the determination in terms of job concatenation made in step S505 in the flowchart illustrated in FIG. 5, one of the criteria for concatenation is that the length of the sheet for a job group does not exceed a predetermined length. In this criterion, the length may be changed in accordance with various conditions.

For example, the length may be changed in accordance with the type of sheet (the material of the sheet) used for the print job. This is because the frequency of a transfer error varies in accordance with the type of sheet, the fixability of a recording agent varies in accordance with the type of sheet, and the length of the sheet that can be rewound by the sheet winding-up unit 113 varies in accordance with the thickness of the sheet.

Figures 7, 8:
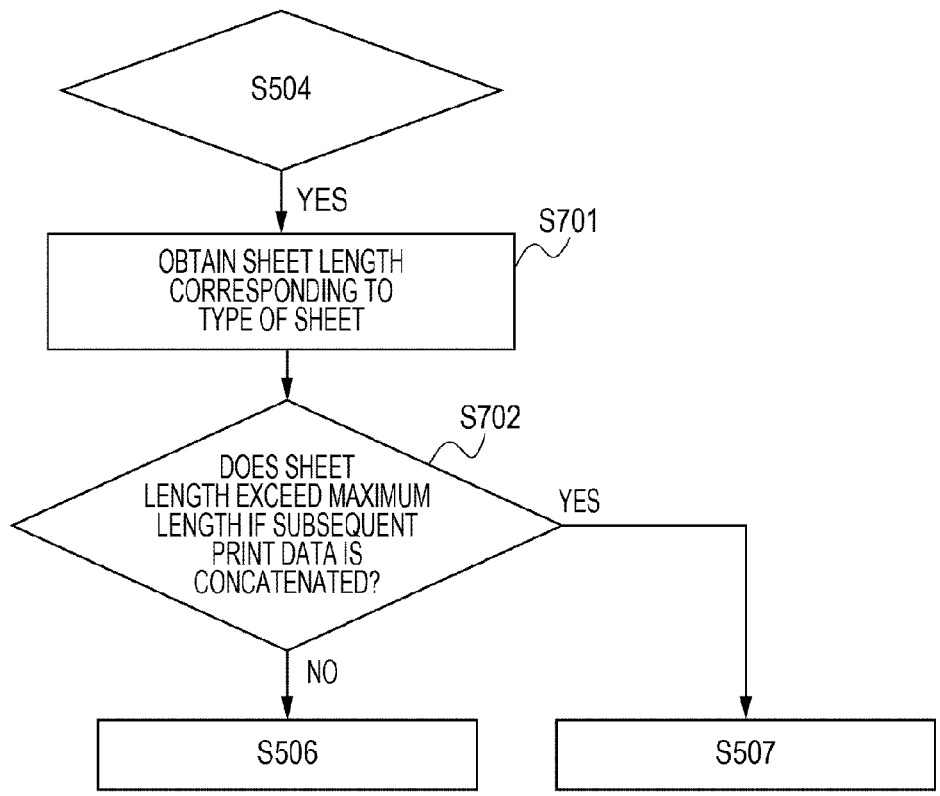
FIG. 7 is a flowchart of the processing according to the embodiment.
FIG. 8 illustrates a maximum length of a sheet for a job group in accordance with the type of sheet.

FIG. 7 is a flowchart of processing performed when it is determined whether jobs can be concatenated in such a case. If, in step S504 shown in FIG. 5, it is determined that concatenation is available, the processing proceeds to step S701, where the length of the sheet corresponding to the type of the sheet is selected. The length of the sheet corresponding to the type of the sheet is prestored in the HDD 204, for example, in the form shown in FIG. 8. The CPU 201 obtains a maximum sheet length corresponding to the type of the sheet used by the print job.

Subsequently, the processing proceeds to step S702, where it is determined whether, when the subsequent print data is concatenated, the length of the sheet after concatenation exceeds the maximum length obtained in step S701. If the length of the sheet does not exceed the maximum length, the processing proceeds to step S506, where concatenation is performed. However, if the length of the sheet exceeds the maximum length, the processing proceeds to step S507, where the job is set in another job group without concatenating the print data.

Through such processing, the length of the sheet for the job group is changed in accordance with the type of sheet used. In this way, the group can have a sheet length appropriate in accordance with a print condition.

Note that the type of the sheet used for a print job can de identified by referring to the job type information included in the print setting for the print job or determining which type of sheet is currently used.

In addition, while the above description has been made with reference to the availability of concatenation on a per page basis, the availability of concatenation on a per job basis can be determined in order to prevent separation of a print job. That is, some print jobs do not have pages having different types of sheet, but have all of the pages having the same type. Such jobs can be processed on a per job basis.

Furthermore, in the above description, the order in which the pages are printed is not limited to that illustrated in FIG. 6B. For example, the order can be changed in a variety of ways in accordance with a mechanism employed by the image forming apparatus 200 and a method for ejecting a sheet. In any case, images of a plurality of print jobs to be arranged on the first surface are continuously printed and, subsequently, images to be arranged on the second surface are printed.

Still furthermore, in the above description, the processing other than the actual printing, such as the scheduling of the print order and determination of the availability of concatenation, may be performed by an external apparatus, such as the host apparatus or an external controller. The image forming apparatus may perform printing in accordance with the result of processing. At that time, it is desirable that the external apparatus receive the status (e.g., information indicating the current printing state and the remaining amount of the sheet) from the image forming apparatus and determine the print order and the availability of concatenation. In such a case, the external apparatus functions as a print control apparatus.

Yet still furthermore, the above-described embodiments can be realized by performing the following processes. That is, software (a program) that realizes the functions of the above-described embodiments is provided to a system or an apparatus via a network or a variety of types of recording medium. A computer (or a CPU or an MPU) of the system or apparatus reads the program and executes the program. At that time, the program may be executed by a single computer or a plurality of computers operable in conjunction with one another. Note that all of the above-described processes need not be realized by software. Some or all of the processes may be realized by hardware. In an example, a computer-readable medium or a computer-readable storage medium may store a program that causes a print control apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041656 filed Feb. 26, 2010, which is hereby incorporated by reference herein in its entirety.

What is claimed is:

1. A print control apparatus configured to cause a printing unit to print page images on a first surface and a second surface of a continuous sheet that is on an opposite side of the first surface, the print control apparatus comprising:
   a receiving unit configured to receive a first print job and a second print job, wherein each print job includes a sheet type and a plurality of page images;
   a determination unit configured to determine whether a first sheet type of the first print job and a second sheet type of the second print job are the same;
   a print control unit configured to cause the printing unit to continuously print page images on the continuous sheet based on the determination result by the determination unit; and
   a cut control unit configured to cause a cutting unit to cut the continuous sheet after a page image has been printed on the first surface and before a page image is printed on the second surface,
   wherein, in response to the determination unit determining that the first sheet type of the first print job and the second sheet type of the second print job are the same, (i) the print control unit causes the printing unit to continuously print a page image of the second print job on the first surface of the continuous sheet adjacent to a page image of the first print job already printed on the first surface of the continuous sheet, (ii) the cut control unit causes the cutting unit to cut the continuous sheet after printing a page image of the second print job on the first surface of the continuous sheet, and then (iii) the print control unit causes the printing unit to print a page image of the second print job and then continuously print a page image of the first print job on the second surface of the continuous sheet so that a second surface page image and a first surface page image are aligned to one another, and
   wherein, in response to the determination unit determining that the first sheet type of the first print job and the second sheet type of the second print job are not the same, (i) the print control unit causes the printing unit not to continuously print a page image of the second print job on the first surface of the continuous sheet adjacent to a page image of the first print job already printed on the first surface of the continuous sheet, (ii) the cut control unit causes the cutting unit to cut the continuous sheet after printing a page image of the first print job and before printing a page image of the second print job, and then (iii) the print control unit causes the printing unit to print a page image of the first print job on the second surface of the continuous sheet; and
   at least one processing unit, wherein at least one of the receiving unit, the determination unit, and the print control unit is implemented by the at least one processing unit.

2. The print control apparatus according to claim 1, wherein the determination unit determines whether a sheet type, which can be used for neighboring page images to be arranged on the first surface of the continuous sheet, are the same.

3. The print control apparatus according to claim 1, wherein the print control unit determines, as a number, how many page images are to be arranged on a same surface of the continuous sheet so that a total length of the page images to be arranged on the same surface of the continuous sheet does not exceed a predetermined length.

4. The print control apparatus according to claim 3, wherein the print control unit determines the number of page images to be arranged on the same surface so that the total length of the page images to be arranged on the same surface of the continuous sheet does not exceed a remaining amount of the continuous sheet.

5. The print control apparatus according to claim 1, further comprising:
a setting unit configured to perform setting as to whether a page image of the first print job to be arranged on the first surface of the continuous sheet and a page image of the second print job to be arranged on the first surface of the continuous sheet are allowed to be continuously printed,
wherein, in response to the continuous printing being allowed by the setting unit and the determination unit determining that the first sheet type of the first print job and the second sheet type of the second print job are the same, the print control unit causes the printing unit to continuously print, on the first surface of the continuous sheet, a page image of the first print job to be arranged on the first surface and a page image of the second print job to be arranged on the first surface,
wherein the setting unit is implemented by the at least one processing unit.

6. The print control apparatus according to claim 1, wherein a sheet type is a size of the sheet and/or a material of the sheet.

7. The print control apparatus according to claim 1, wherein the determination unit determines whether the first sheet type of the first print job and the second sheet type of the second print job are the same by comparing the first sheet type of a last page of the first print job with the second sheet type of a first page of the second print job.

8. The print control apparatus according to claim 1, wherein the determination unit further determines whether a sheet type, which can be used for neighboring page images, is the same for each page image, and wherein the print control unit causes the printing unit to continuously print the page images that have the same sheet type, and to stop a continuous printing if the page images do not have the same sheet type.

9. The print control apparatus according to claim 1, wherein, in a case where the first print job includes at least two sheet types that can be used for the first print job and the second print job includes at least two sheet types that can be used for the second print job, sheet types are considered to be the same by the determination unit in response to one or more sheet types included in the first print job being the same as one or more sheet types included in the second print job, and, in response to sheet types being considered to be the same by the determination unit, the print control unit causes the printing unit to continuously print a page image of the second print job on the first surface of the continuous sheet having a page image of the first print job already printed on the first surface of the continuous sheet.

10. The print control apparatus according to claim 1, wherein the print control unit further is configured to cause a reversing unit to reverse the continuous sheet after a page image has been printed on the first surface and before a page image is printed on the second surface.

11. The print control apparatus according to claim 1, wherein each print job includes a sheet type for a page image of the print job, and
wherein, in response to the determination unit determining that a first sheet type of a page image of the first print job and a second sheet type of a page image of the first print job are the same, the print control unit causes the printing unit to continuously print the page image of the second print job on the first surface of the continuous sheet adjacent to the page image of the first print job already printed on the first surface of the continuous sheet.

12. The print control apparatus according to claim 1, wherein the continuous sheet is a roll sheet that is longer, in a sheet conveying direction, than a sheet having a predetermined length of a unit of printing.

13. The print control apparatus according to claim 1, wherein, in response to the determination unit determining that the first sheet type of the first print job and the second sheet type of the second print job are the same, (i) the print control unit causes the printing unit to continuously print a page image of the second print job on the first surface of the continuous sheet adjacent to a page image of the first print job already printed on the first surface of the continuous sheet and the cut control unit causes the cutting unit not to cut the continuous sheet at a boundary between the plurality of two-sided print jobs before printing on a second surface of the continuous sheet.

14. The print control apparatus according to claim 1, wherein (i) the print control unit causes the printing unit to continuously print, in a direction of conveyance of the continuous sheet, the page image of the second print job on the first surface of the continuous sheet adjacent to a page image of the first print job already printed on the first surface of the continuous sheet.

15. The print control apparatus according to claim 1, wherein (i) the print control unit causes the printing unit to continuously print a page image of the second print job on the first surface of the continuous sheet adjacent to a page image of the first print job already completely printed on the first surface of the continuous sheet.

16. The print control apparatus according to claim 1, wherein, in response to determining that the first sheet type of the first print job and the second sheet type of the second print job are not the same, (ii) the cut control unit causes the cutting unit to cut the continuous sheet immediately after printing a page image of the second print job on the first surface of the continuous sheet.

17. A print control method for a print control apparatus configured to cause a printing unit to print page images on a first surface and a second surface of a continuous sheet that is on an opposite side of the first surface, the print control method comprising:
receiving a first print job and a second print job, wherein each print job includes a sheet type and a plurality of page images;
determining whether a first sheet type of the first print job and a second sheet type of the second print job are the same;
causing the printing unit to continuously print page images on the continuous sheet based on the determination result by the determining; and
causing a cutting unit to cut the continuous sheet after a page image has been printed on the first surface and before a page image is printed on the second surface,
wherein, in response to determining that the first sheet type of the first print job and the second sheet type of the second print job are the same, (i) causing the printing unit to continuously print a page image of the second print job on the first surface of the continuous sheet adjacent to a page image of the first print job already printed on the first surface of the continuous sheet, (ii) causing the cutting unit to cut the continuous sheet after printing a page image of the second print job on the first surface of the continuous sheet, and then (iii) causing the printing unit to print a page image of the second print job and then continuously print a page image of the first print job on the second surface of the continuous sheet so that a second surface page image and a first surface page image are aligned to one another, and wherein, in response to determining that the first sheet type of the first print job and the second sheet type of the second print job are not the same, (i) causing the printing unit not to continuously print a page image of the second print job on the first surface of the continuous sheet adjacent to a page image of the first print job already printed on the first surface of the continuous sheet, (ii) causing the cutting unit to cut the continuous sheet after printing a page image of the first print job and before printing a page image of the second print job, and then (iii) causing the printing unit to print a page image of the first print job on the second surface of the continuous sheet.

18. A non-transitory computer-readable storage medium storing a computer-executable program that causes a print control apparatus to perform the print control method according to claim 17.

19. A print control apparatus configured to cause a printing unit to print page images on a first surface and a second surface of a continuous sheet that is on an opposite side of the first surface, the print control apparatus comprising:

a receiving unit configured to receive a preceding print job and a subsequent print job, wherein each print job includes a plurality of page images;

a determination unit configured to determine whether a sheet type to be used for the preceding print job can be used for the subsequent print job based on the determination result by the determination unit;

a print control unit configured to cause the printing unit to continuously print page images of the preceding print job on the continuous sheet; and a cut control unit configured to cause a cutting unit to cut the continuous sheet after a page image has been printed on the first surface and before a page image is printed on the second surface, wherein, in response to the determination unit determining that the sheet type to be used for the preceding print job can be used for the subsequent print job, (i) the print control unit causes the printing unit to continuously print page images of the subsequent print job on the first surface of the continuous sheet adjacent to a page image of the preceding print job already printed on the first surface of the continuous sheet, (ii) the cut control unit causes the cutting unit to cut the continuous sheet after printing a page image of the subsequent print job on the first surface of the continuous sheet, and then (iii) the print control unit causes the printing unit to print a page image of the preceding print job and a page image of the subsequent print job on the second surface of the continuous sheet so that a second surface page image and a first surface page image are aligned to one another, and wherein, in response to the determination unit determining that the sheet type to be used for the preceding print job cannot be used for the subsequent print job, (i) the print control unit causes the printing unit not to continuously print page images of the subsequent print job on the first surface of the continuous sheet adjacent to a page image of the preceding print job already printed on the first surface of the continuous sheet, (ii) the cut control unit causes the cutting unit to cut the continuous sheet after printing a page image of the first print job and before printing a page image of the subsequent print job, and then (iii) the print control unit causes the printing unit to print a page image of the preceding print job on the second surface of the continuous sheet; and at least one processing unit, wherein at least one of the receiving unit, the determination unit, and the print control unit is implemented by the at least one processing unit.

20. The print control apparatus according to claim 19, wherein the determination unit determines whether the sheet type to be used for the preceding print job can be used for the subsequent print job by comparing the sheet type of a last page of the preceding print job with the sheet type of a first page of the subsequent print job.

21. The print control apparatus according to claim 19, wherein the print control unit further is configured to cause a reversing unit to reverse the continuous sheet after a page image has been printed on the first surface and before a page image is printed on the second surface.

22. The print control apparatus according to claim 19, wherein the preceding print job is printed before the subsequent print job.

23. A print control method for a printing unit to print page images on a first surface and a second surface of a continuous sheet that is on an opposite side of the first surface, the print control method comprising:

receiving a preceding print job and a subsequent print job, wherein each print job includes a plurality of page images;

determining whether a sheet type to be used for the preceding print job can be used for the subsequent print job based on the determination result by the determining;

causing the printing unit to continuously print page images of the preceding print job on the continuous sheet; and causing a cutting unit to cut the continuous sheet after a page image has been printed on the first surface and before a page image is printed on the second surface, wherein, in response to determining that the sheet type to be used for the preceding print job can be used for the subsequent print job, (i) causing the printing unit to continuously print page images of the subsequent print job on the first surface of the continuous sheet adjacent to a page image of the preceding print job already printed on the first surface of the continuous sheet, (ii) causing the cutting unit to cut the continuous sheet after printing a page image of the subsequent print job on the first surface of the continuous sheet, and then (iii) causing the printing unit to print a page image of the preceding print job and a page image of the subsequent print job on the second surface of the continuous sheet so that a second surface page image and a first surface page image are aligned to one another, and wherein, in response to determining that the sheet type to be used for the preceding print job cannot be used for the subsequent print job, (i) causing the printing unit not to continuously print page images of the subsequent print job on the first surface of the continuous sheet adjacent to a page image of the preceding print job already printed on the first surface of the continuous sheet, (ii) causing the cutting unit to cut the continuous sheet after printing a page image of the first print job and before printing a page image of the subsequent print job, and then (iii) causing the printing unit to print a page image of the preceding print job on the second surface of the continuous sheet.

24. A non-transitory computer-readable storage medium storing a computer-executable program that causes a print control apparatus to perform the print control method according to claim 23.

25. A print control apparatus configured to cause a printing unit to print page images on a continuous sheet, the print control apparatus comprising:
- a determination unit configured to determine, for a plurality of page images, whether a sheet type to be used for a preceding page image can be used for a subsequent page image;
- a print control unit configured to cause the printing unit to continuously print page images on the continuous sheet based on the determination result by the determination unit;
- a cutting control unit configured to cause a cutting unit to cut the continuous sheet,
- wherein, in response to the determination unit determining that the sheet type to be used for the preceding page image can be used for the subsequent page image, the print control unit causes the printing unit to continuously print the subsequent page image on a first surface of the continuous sheet adjacent to the preceding page image already printed on the first surface of the continuous sheet without cutting, and
- wherein, in response to the determination unit determining that the sheet type to be used for the preceding page image cannot be used for the subsequent page image, the cutting control unit causes the cutting unit to cut the continuous sheet after the preceding page image has been printed on the first surface of the continuous sheet before printing the subsequent page image; and
- at least one processing unit, wherein at least one of the determination unit and the print control unit is implemented by the at least one processing unit.

26. A print control method for a print control apparatus configured to cause a printing unit to print page images on a continuous sheet, the print control method comprising:
- determining, for a plurality of page images, whether a sheet type to be used for a preceding page image can be used for a subsequent page image;
- causing the printing unit to continuously print page images on the continuous sheet based on the determination result by the determining;
- causing a cutting unit to cut the continuous sheet,
- wherein, in response to determining that the sheet type to be used for the preceding page image can be used for the subsequent page image, causing the printing unit to continuously print the subsequent page image on a first surface of the continuous sheet adjacent to the preceding page image already printed on the first surface of the continuous sheet without cutting, and
- wherein, in response to determining that the sheet type to be used for the preceding page image cannot be used for the subsequent page image, causing the cutting unit to cut the continuous sheet after the preceding page image has been printed on the first surface of the continuous sheet before printing the subsequent page image.

27. A non-transitory computer-readable storage medium storing a computer-executable program that causes a print control apparatus to perform the print control method according to claim 26.

* * * * *